H. C. SCHAPER.
SCALE BEAM LOCK AND SWITCH OPERATING DEVICE.
APPLICATION FILED FEB. 9, 1918.
1,297,738. Patented Mar. 18, 1919.
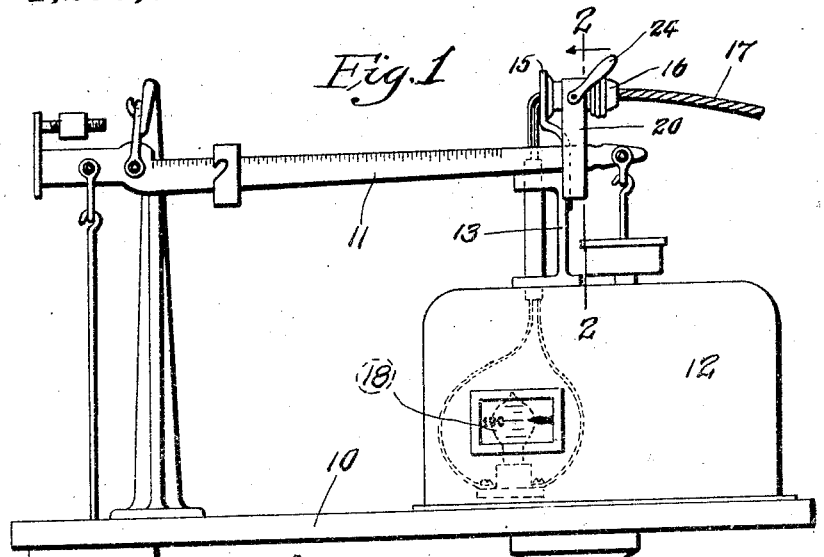
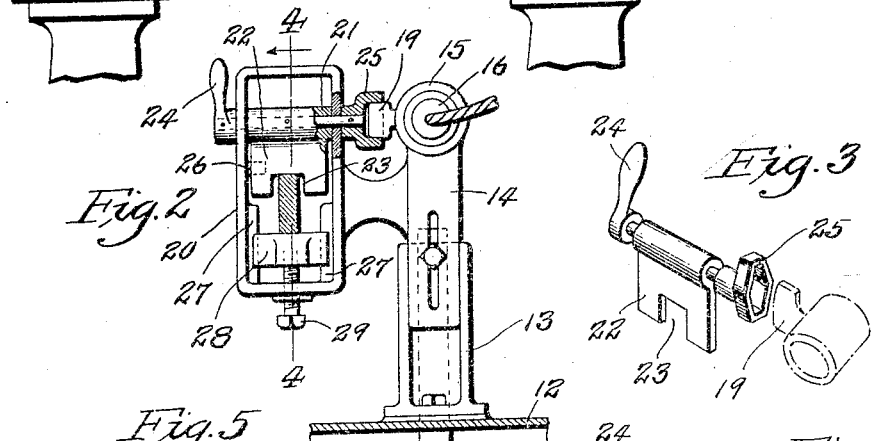
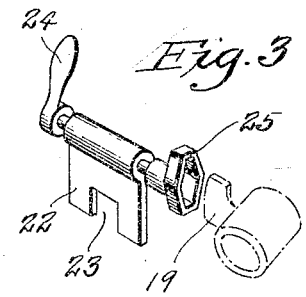
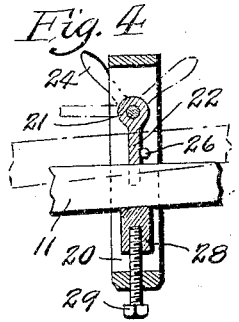
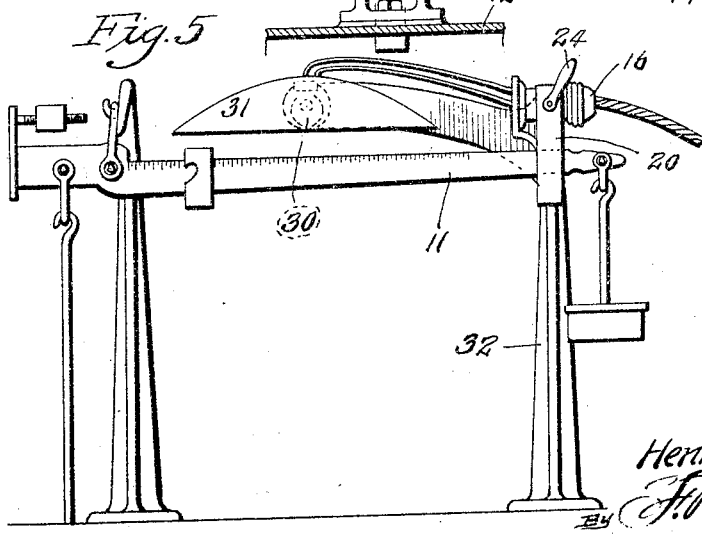
Inventor
Henry C. Schaper

UNITED STATES PATENT OFFICE.

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

SCALE-BEAM LOCK AND SWITCH-OPERATING DEVICE.

1,297,738.　　　Specification of Letters Patent.　　Patented Mar. 18, 1919.

Application filed February 9, 1918. Serial No. 216,205.

*To all whom it may concern:*

Be it known that I, HENRY C. SCHAPER, a citizen of the United States, residing at St. Louis, Missouri, have invented a certain new and useful Improvement in Scale-Beam Locks and Switch-Operating Devices, of which the following is a full, clear, and exact description, such as will enable others skilled in the art to which it appertains to make and use the same, reference being had to the accompanying drawings, forming part of this specification.

My invention relates to a device for locking the beam or lever of a scale or weighing machine and for operating the switch of an electric lamp which latter is utilized in a weight indicator for the scale or for illuminating the graduated face of the scale beam or lever.

The invention herein disclosed is particularly designed for use in connection with the weight indicator for scales disclosed in my copending application filed December 18, 1917, Serial Number 207,683.

The apparatus disclosed in my copending application includes mechanism connected to and actuated by the graduated beam or lever of a scale for automatically indicating on a screen or ground glass the amounts of the loads placed on the scale platform and this indicating mechanism includes an electric lamp, the light from which is needed only while the indicating mechanism is in service.

Further, it is desirable that the scale beam to which the indicating mechanism is connected be locked against vibratory movement while not in use, and it is the object of my invention to provide simple and efficient means for locking the scale beam against movement and at the same time manipulating a switch in the circuit leading to the lamp in the indicating means, thereby cutting said lamp out of service simultaneously with the beam locking operation. Necessarily, a reverse movement imparted to the device contemplated by my invention will release the scale beam or lever so that the same can operate in the usual manner and at the same time close the switch in the electric circuit so that the lamp in the indicating mechanism will burn. In some instances, it is necessary to place an electric lamp in a position where its rays will fall directly on the graduated face of the scale beam or lever in order to effect a ready reading of the weights placed on the scale platform and indicated on said beam or lever, and it is one of the objects of my invention to provide a device which can be utilized for simultaneously manipulating the switch controlling the circuit to this lamp and locking or unlocking the scale beam with which said lamp is associated.

With the foregoing and other objects in view, my invention consists in certain novel features of construction and arrangement of parts, hereinafter more fully described and claimed and illustrated in the accompanying drawings, in which—

Figure 1 is a front elevational view of the upper portion of a beam scale, the same being equipped with an automatic indicating mechanism and with a scale beam lock and switch operating device constructed in accordance with my invention.

Fig. 2 is an enlarged vertical section taken approximately on the line 2—2 of Fig. 1.

Fig. 3 is a perspective view of the locking member for the scale beam and the socket which engages the key of an electric switch.

Fig. 4 is a vertical section taken approximately on the line 4—4 of Fig. 2.

Fig. 5 is an elevational view of the upper portion of a beam scale having an electric lamp and reflector positioned adjacent to the scale beam or lever and showing my improved beam lock and switch operating device associated therewith.

Referring by numerals to the accompanying drawings and particularly Figs. 1 to 4 inclusive, which illustrate a practical embodiment of my invention, 10 designates the table of an ordinary beam scale, 11 the graduated beam or lever thereof, and 12 the housing which incloses the operating mechanism of the automatic weight indicator.

Secured in any suitable manner on top of the housing 12 is a post 13 and mounted for vertical adjustment thereupon is a plate 14, the upper end of which is provided with a collar or housing 15 which serves as a seat for an ordinary electric switch 16. This switch is located in series with one of the conductors 17 which carry current to a lamp 18, the latter being located within housing 12 and associated with the weight indicating mechanism. This switch 16 is opened and closed by means of an ordinary key 19, the same projecting laterally from the body of the switch and the support 15.

Fixed to and supported by plate 14 is a loop 20 which incloses the outer end portion of scale beam 11 and journaled in the upper portion of this loop is a shaft 21 on which within said loop is fixed a plate 22. Formed in the lower end of this plate is a notch 23, the same being adapted to receive the scale beam 11. One end of shaft 21 is provided with an operating handle 24 and the opposite end is provided with a socket 25, the latter being adapted to receive the electric switch key 19.

Projecting inwardly from one side of the loop 20 is a lug 26, the same performing the functions of a stop to limit the movement of plate 22 when the latter is swung downward into position to lock the scale beam against vertical movement.

Arranged for sliding movement between guides 27 which are formed on the lower portions of the sides of loop 20 is a block 28, the vertical position of which is regulated by means of a screw 29, the latter passing through the bottom of loop 20.

The operation of my improved scale beam lock and switch operating device is extremely simple, it only being necessary to shift the position of handle 24 in order to swing the plate 22 upward or downward as the case may be and simultaneously turn the switch key 19. When the handle is manipulated so as to swing plate 22 downward into a substantially vertical position as illustrated in Figs. 2 and 3, the notched lower end of said plate will engage on top of the outer end of the scale beam 11, thereby locking the same against vertical movement, and as such action takes place, the switch key 19 will be turned so as to open the circuit in the conductors leading to lamp 18. A reverse movement of handle 24 will swing plate 22 upward into the position illustrated by dotted lines in Fig. 4, thereby freeing the scale beam 11 so that it can vibrate vertically in the usual manner while the weighing operations are being performed, and this unlocking movement manipulates the switch key 19 so that the switch in the circuit to the lamp is closed, thereby causing said lamp to burn while the scale and the indicating mechanism are in service.

In the modified construction illustrated in Fig. 5, a lamp 30 arranged within a suitable reflector 31 is located so that the rays from said lamp will fall directly on the graduated surface of the scale beam and the switch controlling this lamp and the beam locking plate are preferably arranged on the upper portion of the standard 52 which is located adjacent to the outer end of the scale beam.

A scale beam lock and switch operating device of my improved construction is comparatively simple, is very effective in use, is applicable for all beam scales equipped with automatic indicators or with electric lamps used for illuminating the graduated faces of the scale beams, and said device by a single operation is instrumental in locking or unlocking the scale beam and correspondingly opening or closing the switch located in the circuit of the electric lamp associated with the scale.

It will be readily understood that minor changes in the size, form and construction of the various parts of my improved scale beam lock may be made and substituted for those herein shown and described, without departing from the spirit of my invention, the scope of which is set forth in the appended claims.

I claim:

1. The combination with a scale beam and an electric switch located adjacent to said beam, which switch includes a key, of means for locking the scale beam against movement and simultaneously turning the key of the electric switch.

2. The combination with a scale beam and an electric switch located adjacent to said beam, which switch includes a key, of a member mounted for operation adjacent to said scale beam and switch, a portion of which member is adapted to be moved into the path of travel of the scale beam and another portion of said member being adapted to engage the switch key.

3. In a device of the class described, a standard, a loop on said standard, a scale beam which passes through said loop, a support on said standard for an electric switch, the latter being provided with a key and manually operable means arranged on said loop, a portion of which means is adapted to be moved into the path of travel of the scale beam, and another portion of said means being adapted to engage the key of the electric switch.

4. The combination with a scale provided with a beam and an electric switch located adjacent to said beam which switch is provided with a key, of a key actuating member mounted for operation adjacent to said beam, and a portion of which member is adapted to move into and out of engagement with said beam.

5. In a device of the class described, the combination with a scale beam, of a loop adapted to inclose the outer portion of said scale beam, adjustable means for limiting the downward movement of the scale beam within said loop, and a member mounted for operation in the upper portion of said loop and adapted to be swung downward into engagement with the top of the beam.

6. In a device of the class described, the combination with a scale beam, of a loop adapted to inclose the outer portion of said scale beam, adjustable means for limiting the downward movement of the scale beam within said loop, a member mounted for operation in the upper portion of said loop and adapted to be swung downward into engagement with the top of the beam, and means on said member for engaging a part of an electric switch.

7. The combination with a scale beam, of a support adjacent to said scale beam, an electric switch on said support, and a manually operable member pivotally mounted on said support, said member having a part adapted to engage the scale beam to lock the same against movement and also having a part adapted to engage the key of the electric switch.

8. The combination with a scale beam, of a support adjacent to said scale beam, an electric switch on said support, a manually operable member pivotally mounted on said support, said member having a part adapted to engage the scale beam to lock the same against movement and also having a part adapted to engage the key of the electric switch, and an adjustable member on said support and disposed below the beam for limiting the downward movement of said beam.

9. The combination with a scale beam, of an adjustable support adjacent to said scale beam, an electric switch on said support, a manually operable member pivotally mounted on said support, said member having a part adapted to engage the scale beam to lock the same against movement and also having a part adapted to engage the key of the electric switch, and an adjustable member on said support and disposed below the beam for limiting the downward movement of said beam.

In testimony whereof I hereunto affix my signature this 30th day of January, 1918.

HENRY. C. SCHAPER.